US006795918B1

(12) United States Patent
Trolan

(10) Patent No.: US 6,795,918 B1
(45) Date of Patent: Sep. 21, 2004

(54) SERVICE LEVEL COMPUTER SECURITY

(76) Inventor: Steven T. Trolan, 14677 Shannon Rd., Los Gatos, CA (US) 95032

(*) Notice: Subject to any disclaimer, the term of this patent is extended or adjusted under 35 U.S.C. 154(b) by 0 days.

(21) Appl. No.: 09/519,952

(22) Filed: Mar. 7, 2000

(51) Int. Cl.[7] .................................................. G06F 1/24
(52) U.S. Cl. ...................... 713/160; 713/165; 713/167; 713/182; 713/200; 713/201
(58) Field of Search ................................. 713/160, 165, 713/167, 182, 200, 201

(56) References Cited

U.S. PATENT DOCUMENTS 4,709,136 A    11/1987  Watanabe
5,222,120 A *  6/1993  McLeod et al. .......... 379/88.24
5,802,320 A    9/1998  Baehr et al.
6,026,379 A *  2/2000  Haller et al. ................. 705/34

OTHER PUBLICATIONS

Andy Briney, "Got Security?" Cover Story '99 Survey.
Andy Briney, "Got Security?" Cover Story '99 Survey–Chart.

* cited by examiner

Primary Examiner—Thomas R. Peeso
(74) Attorney, Agent, or Firm—Townsend and Townsend and Crew LLP

(57) ABSTRACT

Novel apparatus and methods for filtering data packets by providing non-user configurable authorization data. The invention provides an efficient, quick, secure, and simple to implement technique for computer communication security, in part, by utilizing service level filtering of data packets.

26 Claims, 3 Drawing Sheets

SERVICE LEVEL COMPUTER SECURITY

CROSS-REFERENCES TO RELATED APPLICATIONS

This application is related to application Ser. Nos. 09/519,711, filed Mar. 7, 2000, entitled "Portable Computer Security," and 09/521,453, filed Mar. 7, 2000, entitled "Smart Card Computer Security," filed on the same date as the present application, all in the name of the present assignee. All of these documents are hereby incorporated herein by reference for all purposes.

BACKGROUND OF THE INVENTION

The present invention relates generally to computer security and, more particularly, to security apparatus and methods for use with computers connected to a computer network, such as the Internet or an intranet.

The growth of the Internet has provided an enormous information resource to the millions of computer users around the world. The Internet permits a user from practically anywhere in the world to access another computer anywhere else in the world without much effort by utilizing easy to remember computer domain names. It is just as easy for a computer hacker to access an innocent computer user's hardware, software, and information. Especially, with the fast connection services provided by today's Internet service providers (ISPs), the hackers have an even easier time breaking into home and small office computers.

The ease in hacking is partly possible because of the increasing availability of high-speed Internet digital subscriber line (DSL) and its varieties such as asynchronous DSL (ADSL) and high-bit-rate DSL (HDSL), and cable modem. These services provide not only a much faster connection but also a service that is always on. Additionally, a more mature broadband Internet service, called integrated services digital network (ISDN), continues to pose a similar threat. Accordingly, hackers can break into unsecured systems faster because of the higher speeds, and whenever they want to because of the always-on services. Additionally, because of already available tools, hackers have an even easier task. See, for example, the article entitled "Tools of the Trade" by Edward Skoudis, in the March 1999 issue of Information Security Magazine, which is hereby incorporated herein by reference for all purposes. With these types of tools, someone can remotely control or clandestinely observe all activity on the targeted machine. Moreover, hackers can get access to even a basic PC or Mac through a variety of methods, such as e-mailing a program that inserts a hidden back door or exploiting openings designed for file or printer sharing. Also, since computers are becoming easier to use and cheaper to own, more and more computer users are utilizing their computers for keeping track of their finances, personal communications, remote access to their office systems, and maintaining other types of confidential information. Hackers love this vast amount of information readily available on a personal computer.

Generally, each computer connected to the Internet has a unique Internet protocol (IP) address. Hackers often flood a target computer network with many IP address requests to identify potential targets on that network. Once hackers learn the IP address of a target, they flood that computer with many requests to determine through which "door" they can enter the target. The doors for computers are called service ports. Each service is assigned its own port number. For example, port 23 is for Telnet services, which allows a remote user to login to a computer and access information on its hard drive. Hackers will probe all the known ports they can, until they find an open port. Once in the system, hackers can do as they wish, including open other service ports or even crash the system.

There are currently 65,663 service ports available for transmission control protocol/Internet protocol (TCP/IP) communications, which is the general communication protocol for the Internet. There are two types of service ports: privileged and unprivileged. The server service ports generally have a port number below 1,024, which are known as privileged ports and can be assigned to specific services. Conversely, the client service ports have a port number at least 1,024. Most of the service ports on computers are not used today. Consequently, if a hacker can use one of these unused service ports to access information, the unauthorized use will most likely not interfere with the authorized services already in use. Another risk is that some of these service ports can give direct access to computers' storage devices.

There are numerous hardware and software solutions (called "firewalls") already available on the market for securing computers. The hardware-based solutions, however, are generally designed to protect a corporate intranet or a network segment, and are often impractical and too complex for implementation at home, for a small business, or for users on the road. These systems are generally designed to manage the security of multiple network addresses and log all network activity through a given device. At a minimum, these systems require a knowledgeable information systems (IS) personnel to install and/or maintain, who come at a fairly significant cost.

Similarly, present software solutions are often cumbersome to use because they must often be installed on a computer system to be protective. These solutions may pose conflicts with other software installed on that computer system. Another issue is that when installing new software or upgrading old software, the firewall software may be accidentally disabled or overwritten, leaving an open door for the hackers. Also, like other software solutions, software-only security is inherently easier to break into because the security software can reside on a remotely accessible computer.

These firewalls can also be very complex. For example, they can block certain IP addresses from accessing a target system based on a certain number of connection attempts. Other solutions incorporate features such as virtual private networking (VPN) which utilizes encryption. Yet others use association to permit a connection or use sophisticated knowledge databases. Accordingly, these firewalls often far exceed the needs of a single client workstation or a small office/home office (SOHO) environment.

No matter how sophisticated a computer security system, most experts agree that it can still be breached. Every year, computer hackers cost computer users millions of dollars in lost data, man-hours, and lost trade secrets. With hacking on the rise, as indicated by a study conducted by International Computer Security Association (ICSA) and Global Integrity Corporation, along with the growth of high speed networking to the home, the hacking of home-based and notebook computers can be a starting point for novice hackers, and quite possibly a stepping-stone into corporate networks.

Additionally, the present security solutions often have their own IP addresses which readily allows these security solutions to be identified as targets. In the case of software solutions, the loophole IP address would be the same as the computer on which it is installed. In case of the hardware solutions, the IP address is often provided so that the firewall can be configured via, for example, a remote terminal on the secured network.

Therefore, what is needed is a simple to implement, inexpensive, relatively fast, efficient, and non-user configurable solution for a computer user at home, on the road, or in a small office, to be able to protect itself from computer hackers.

SUMMARY OF THE INVENTION

According to the present invention, a technique is disclosed for filtering data packets using novel apparatus and methods by providing authorization data. In an embodiment, the authorization data is non-user configurable. In a specific embodiment, the term non-configurable generally means that the user does not have to adjust settings on the present device and/or the computer on the protected local area network, wide area network, or private network. The invention provides an efficient, quick, secure, and simple to implement technique for secure computer communication, in part, by utilizing service level filtering of data packets.

In a preferred embodiment, a method for filtering a plurality of data packets is provided. The method includes receiving a data packet. The received data packet comprises source, destination, and protocol information. The method extracts the source, destination, and protocol information from the received data packet and provides the extracted information to a non-user configurable decision block. The decision block includes information about which services are authorized based on the extracted information. In a specific embodiment, the decision block information is substantially unrelated to an IP address of the data packet to allow the non-user configurable decision block to operate without knowledge of any IP addresses in the IP header, for example, (e.g., destination address, source address). The method drops the received data packet if the extracted information indicates a request for access to an unauthorized service. Alternatively, the method permits the received data packet to go through if the extracted information indicates a request for access to an authorized service.

In a further embodiment, a computer security apparatus is disclosed. The apparatus includes a communication interfaces coupled to a public network and a private network. The apparatus also includes a packet analyzer. The packet analyzer only permits data packets for a selected group of services to be communicated between the private and public networks.

In yet another embodiment, the packet analyzer includes a lookup table device that is non-configurable by a computer user. The packet analyzer can also include storage units for the protocol, destination port, and source ports of the data packet being analyzed. The lookup table can be coupled to the protocol storage, the source port storage, and the destination port storage devices. The lookup table can determine whether the data packet should be authorized to be forwarded through the computer security apparatus.

In still a further embodiment, the present invention provides a method for for converting an unsecured digital transmission line into a secured digital transmission line for transmission of digital data. The digital data are selected from a transmission medium selected from cable modem, xDSL, and other network communications.

Advantages of the invention include a simple to implement system for securing computer communications. The invention also provides quick performance because the filtering technique only evaluates limited information contained within a data packet. Additionally, the invention provides a technique for secure computer communication without regard for the cumbersome IP address evaluations performed by the prior art. Yet another advantage of the present invention is providing a non-user configurable security which blocks remote hacking attempts.

Further understanding of the nature and advantages of the invention may be realized by reference to the remaining portions of the specification and drawings.

DESCRIPTION OF THE SPECIFIC EMBODIMENTS

The present invention will now be described in reference to preferred embodiments that operate as computer security apparatus and methods. Specifically, examples will be described which illustrate particular features of the invention. The present invention, however, is not limited to any particular features nor limited by the examples described herein. Therefore, the descriptions of the embodiments that follow are for purposes of illustration and not limitation.

Figure 1:
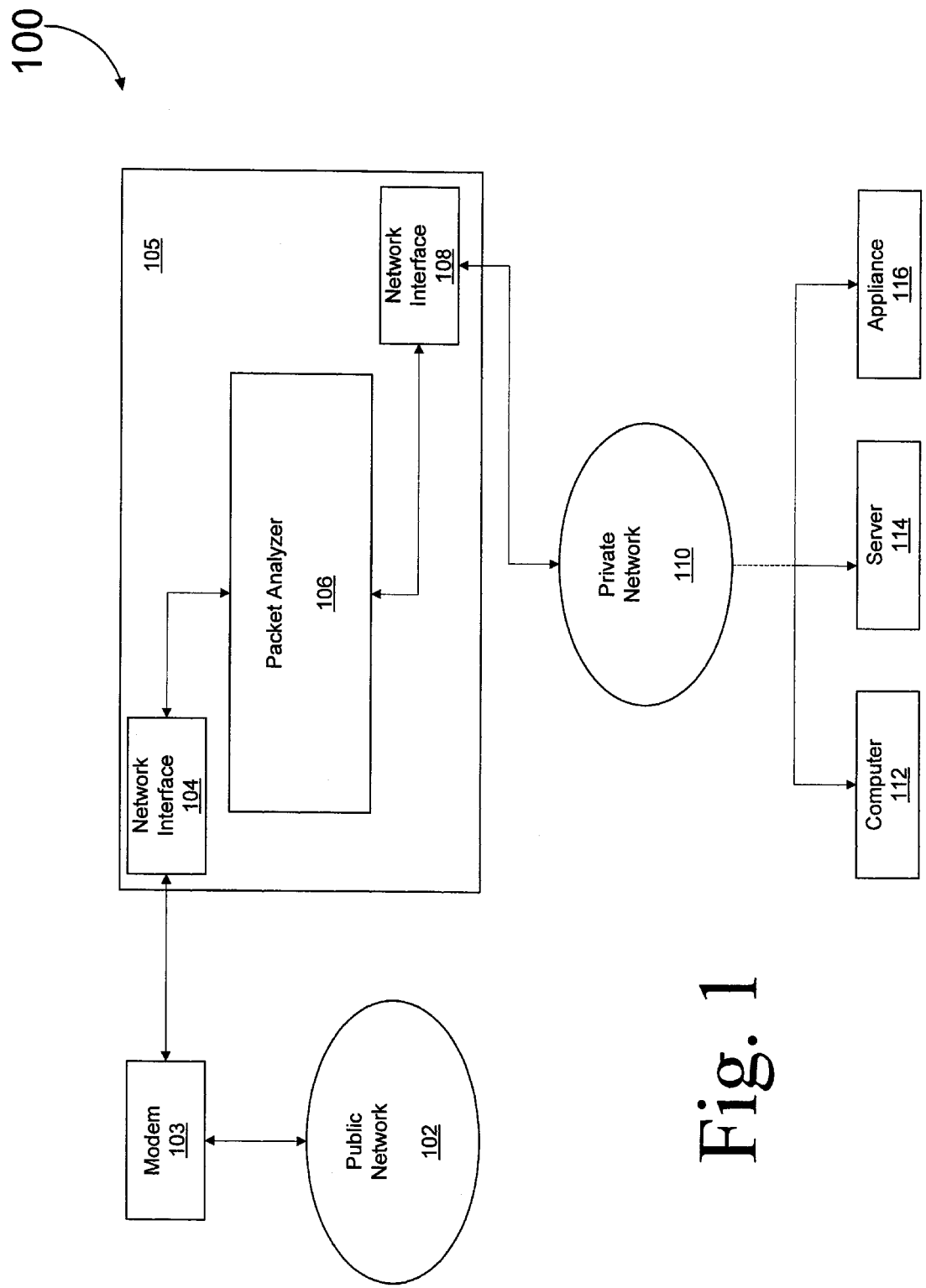
FIG. 1 is a simplified exemplary block diagram of a computer security system 100 in accordance with an embodiment of the present invention.

FIG. 1 is a simplified exemplary block diagram of a computer security system 100 in accordance with an embodiment of the present invention. The computer security system 100 provides security from intruders and computer hackers. The computer security system 100 includes a public network 102, a computer security apparatus 105, and a private network 110. The computer security system 100 provides secure communication between the public network 102 and the private network 110 by utilizing the computer security apparatus 105. The public network 102 is preferably the Internet, and can be any type of computer network, computer server, an intranet, or any local area network (LAN). The private network 110 can be any LAN such as an intranet. The private network 110 can be coupled to any number of computers such as a computer 112, a server 114, or an appliance 116. Such connections can be made by, for example, utilizing a hub or switch, such as those provided by 3COM®, Nortel Networks®, Lucent Technologies®, and Cisco Systems®. Devices 112, 114, 116, in various embodiments of the invention, can be any type of a digital device and running an operating system, including Windows™, an Apple Macintosh™, Linux, UNIX, and the like, which supports a computer networking protocol. These devices can include input and output devices (e.g., a keyboard, mouse, trackball, display, printer, speaker, network interfaces), storage devices (e.g., hard drives, flash cards, and memory chips), and the like (not shown).

The computer security apparatus 105 examines the data being passed through it to determine which data should be authorized to go through and which data should be dropped. The computer security apparatus 105 can be coupled to the public network 102 via a modem 103. The modem 103 can be any type of modem, and preferably is a fast modem such as a DSL (or its varieties such as ADSL and HDSL), cable, or ISDN modem. The modem 103 preferably has an RJ45 connector which can couple the modem 103 to the computer security apparatus 105. Similarly, the computer security apparatus 105 can have an RJ45 connector which can couple it to the private network 110. The RJ45 connector of the computer security apparatus 105 can be coupled to the network interfaces 104 and 108 to provide an interface for communication. The network interfaces 104 and 108 can be any type of interface such as Ethernet (10BaseT), FastEthernet (100BaseT), TokenRing®, Frame Relay, asynchronous transfer mode (ATM), universal serial bus (USB), fiber distributed data interface (FDDI), and the like.

The computer security apparatus 105 also includes a packet analyzer 106. Data transferred via computer networks, such as the Internet, is often packaged in data packets. The packet analyzer 106 analyzes the data packets received from the public network 102 and determines whether that data packet being analyzed is to be passed to the private network 110. As illustrated in FIG. 1, the same packet analyzer 106 can also analyze the data packets received from the private network 110 and determines whether the data packet being analyzed is to be passed to the public network 102. Alternatively, different packet analyzers can be utilized to deal with data being passed between the public network 102 or the private network 110, based on packet directions and/or types.

Figure 2:
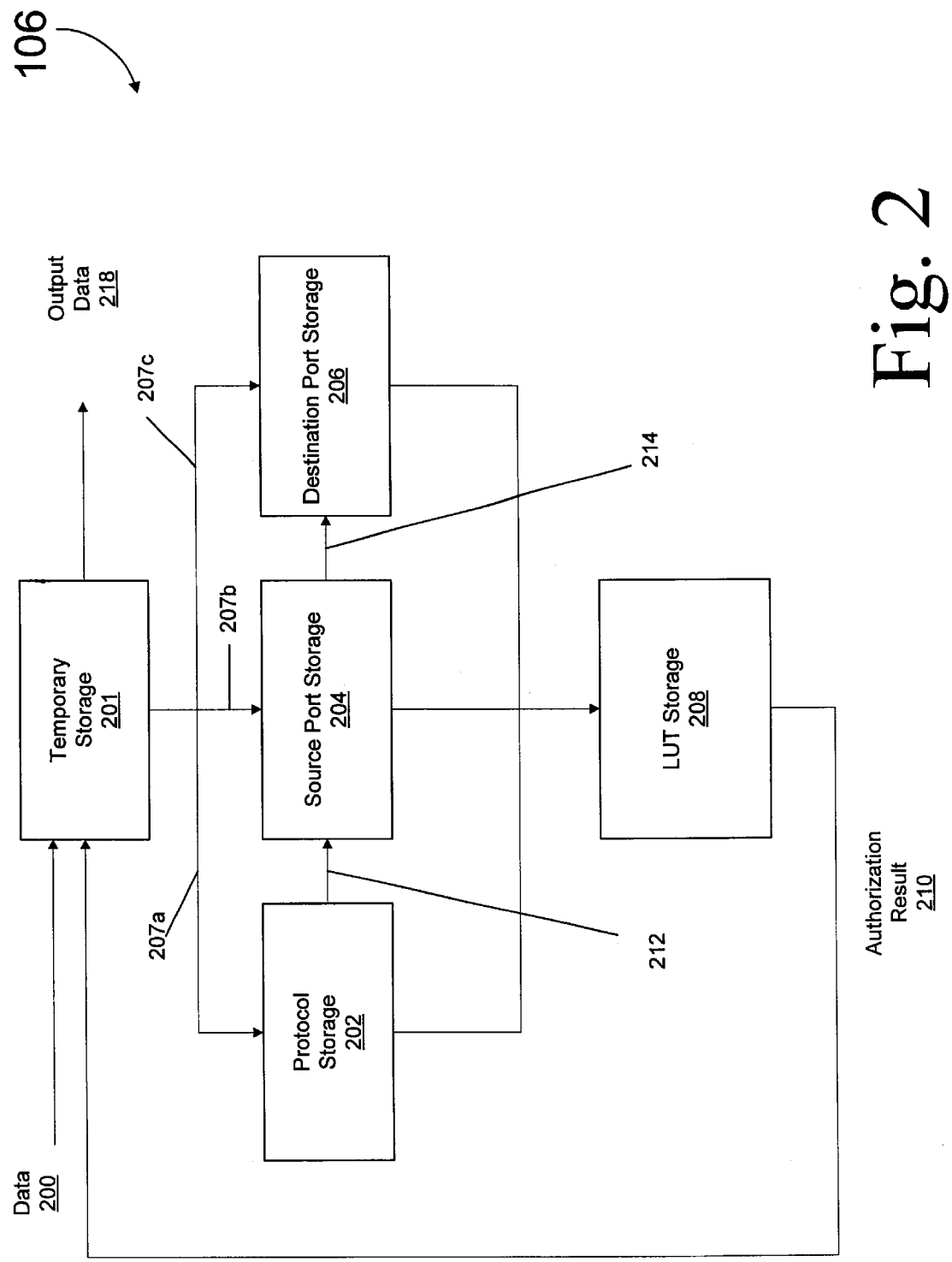
FIG. 2 is a simplified exemplary block diagram of a portion of the packet analyzer 106 of FIG. 1 in accordance with an embodiment of the present invention.

FIG. 2 is a simplified exemplary block diagram of a portion of the packet analyzer 106 of FIG. 1. Data packets to be analyzed are received at an input node 200. The input node 200 is coupled to a temporary storage 201. The temporary storage 201 can be any type of memory, including random access memory (RAM), dynamic RAM (DRAM), static RAM (SRAM), synchronous DRAM (SDRAM), and the like. The temporary storage 201 stores the data packets while they are being analyzed by the packet analyzer 106. The temporary storage 201 will provide specific information contained within each data packet to a protocol storage 202, a source port storage 204, and a destination port storage 206. The storage units 202, 204, 206 can have any size, and are preferably 16 bits wide each for TCP/IP communications. The specific information passed to the storage units 202, 204, and 206 is preferably extracted IP and TCP header information. For TCP/IP communication over Ethernet, the Ethernet Frame header can be 22 bytes wide, the IP header information can be 20 bytes wide, and the TCP header can be 36 bytes wide. As a result, the temporary storage 201 is preferably at least about 78 bytes wide. The temporary storage 201 can also be large enough to cache multiple Ethernet packets. Within the Ethernet packet, the IP header information will contain the communication protocol which is passed to the protocol storage 202. The TCP header, generally following the IP header information, will include the source port and destination port information which are passed to the source port storage 204 and destination port storage 206, respectively.

The information passed to the storage units 202, 204, and 206 can be transferred in at least two ways. First, the specific data can be passed to these units via, for example connections 207a–c. Second, all the specific data intended for the storage units 202, 204, and 206 can be passed through connection 207a to the protocol storage 202 and then shifted through connections 212 and 214 until each of the storage units 202, 204, and 206 contain their desired data. Once the storage units 202, 204, and 206 are loaded with the appropriate information, this information can be provided to a lookup table (LUT) storage 208. As illustrated in FIG. 2, the LUT storage 208 can be coupled to the storage units 202, 204, and 206. Alternatively, the storage units 202, 204, and 206 can be implemented in the same storage unit and the LUT storage 208 can have direct access to that storage unit, which in some embodiments can be the temporary storage 201, or the storage within the modem 103.

The LUT storage 208 contains result codes for whether a given packet with the identified protocol, source port, and destination port should be authorized to pass through the packet analyzer 106, and hence through the computer security apparatus 105. In an embodiment, authorized protocols can include user datagram protocol (UDP) and TCP. For TCP, the authorized services can include Telnet, file transfer protocol (FTP), hyper text transfer protocol (HTTP), hyper text transfer protocol secure (HTTPS), simple mail transfer protocol (SMTP), post office protocol (POP and its different versions such as POP3), Real Audio, H.323 (for voice over IP and the like), and VPN. For UDP, the authorized services can include Traceroute and dynamic host configuration protocol (DHCP). In an embodiment, unauthorized services can include all Internet control message protocols (ICMPs), as well as most other TCP and UDP services. Of course, depending on the implementation, different services can be authorized. Further information regarding commonly used ports for firewalls can be obtained from Internet Assigned Numbers Authority (IANA). Such information can be found at ftp.isi.edu/in-notes/iana/assignments/port-numbers, which is hereby incorporated herein for all purposes. Also, further information regarding port numbers for use with Novelle® BorderManager™ and other firewalls can be found at www.connecttotel.com/border/bmports.html and the connecttotel home page at www.connecttotel.com. These information are hereby incorporated herein by reference for all purposes.

Table 1 below illustrates exemplary information regarding data which can be stored in the LUT 208. The service column indicates the service being utilized and the description column provides a brief description of that service. The protocol column illustrates the protocol information that can, for example, correspond to the protocol storage 202. Similarly, the server port and client port columns indicate information corresponding to the source port storage 204 and the destination port storage 206. Depending on the direction of data (whether from or to the public network, for example), the server port can correspond to one or the other of the storage units 204 or 206. For example, for data from the public network 102 to the private network 110, the server port information would correspond to the source port storage 204 and the client port information can correspond to the destination port storage 206. In an embodiment, only information relating to protocol, server port, and client ports are stored in the LUT 208.

TABLE 1

Services in LUT

| Service | Protocol | Server Port | Client Port | Description |
|---|---|---|---|---|
| FTP-data | TCP | 20 | >1024 | file transfer protocol - data |
| FTP | TCP | 21 | >1024 | file transfer protocol |
| Telnet | TCP | 23 | >1024 | remote login service |
| SMTP | TCP | 25 | >1024 | E-mail |
| DHCP | UDP | 67 | 68 | dynamically assigns IP addresses |
| HTTP | TCP | 80 | >1024 | web service |
| POP3 | TCP | 110 | >1024 | post office protocol (mail delivery service) |

TABLE 1-continued

Services in LUT

| Service | Protocol | Server Port | Client Port | Description |
|---|---|---|---|---|
| HTTPS | TCP | 443 | >1024 | secure web services using X509 standards |
| Real Audio | TCP | 554 | >1024 | music and video server on the Internet |
| H.323 | TCP | 1720 | >1024 | voice over IP. NetMeeting collaboration over the internet |
| Real Audio | TCP | 7070 | >1024 | one way music and video over the Internet |
| Real Audio | TCP | 7071 | >1024 | one way music and video over the Internet |

The LUT storage 208 can provide an authorization result 210 back to the temporary storage 201 which stores the data packet being analyzed currently. Depending on the authorization result 210, the temporary storage 201 can either pass the data packet as an output data 218, or just drop the given data packet. Alternatively, another switching component coupled to the temporary storage 201 can be utilized to allow the current data packet to be passed or dropped. The LUT storage 208 can be selected from a variety of already available field programmable gate-array (FPGA) or programmable logic device (PLD) chips, such as a Spartan II chip made by Xilinx® of San Jose, Calif. or Configurable System on a Chip (CsoC) technology from Triscend® of Mountain View, Calif. The LUT storage 208 is preferably not user configurable and its information can only be modified by having direct physical access to the hardware. As a result, a remote intruder can not bypass the security provided by the embodiments of the present invention.

It is also envisioned that the modem 103 may provide the functionality of the temporary storage 201 and that the requisite information can be either directly passed to each of the storage units 202, 204, and 206 or, alternatively, shifted through the protocol storage 202 to the other storage units (204 and 206). It is also envisioned that the present invention can include multiple pipelines to process multiple incoming data packets simultaneously. The pipeline design can either use the same LUT storage 208, have multiple LUT storage units with identical or differing data, depending for example on the direction or type of data packets involved. There can also be provided a reset signal that can flush the packet analyzer 106 and/or the computer security apparatus 105.

Figure 3:
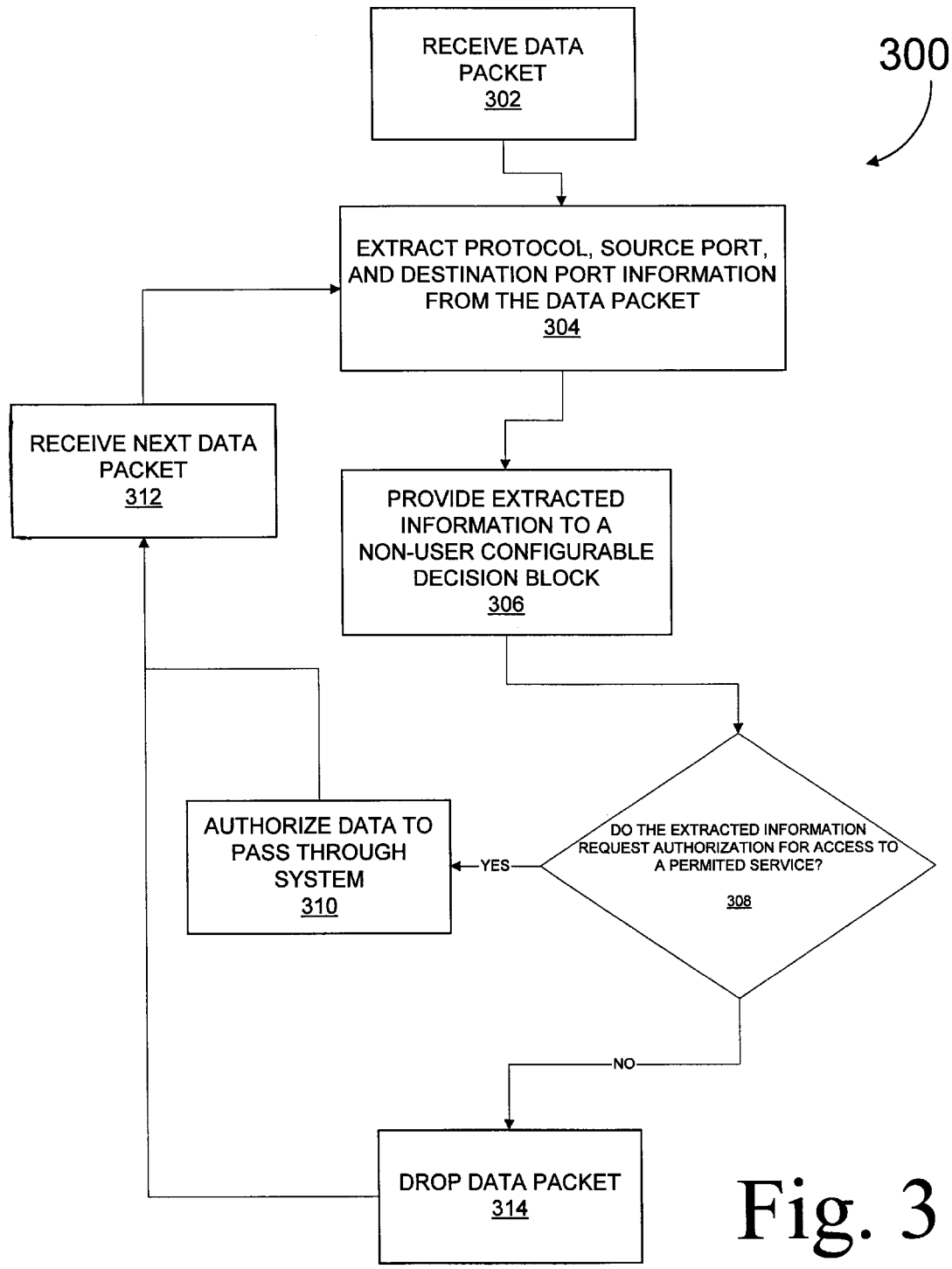
FIG. 3 is a simplified flow diagram of a method (300) of filtering a plurality of data packets in accordance with an embodiment of the present invention.

FIG. 3 is a simplified flow diagram of a method 300 of filtering a plurality of data packets in accordance with an embodiment of the present invention. In a step 302, data packets are received. In a step 304, protocol, source port, and destination port information are extracted from the received data packet. In a step 306, the extracted information is provided to a decision block. The decision block is preferably non-user configurable for at least security reasons. In a specific embodiment, the term non-configurable generally means that the user does not have to adjust settings on the present device and/or the computer on the protected local area network, wide area network, or private network. If the extracted information is directed at an authorized service, the data packets are allowed to pass through the system in a step 310. After the step 310, the next data packet is received and the method continues at the step 304. Alternatively, if the extracted information is directed at an unauthorized service, the data packet is dropped in a step 314. After the step 314, the next data packet is received and the method continues at the step 304. The method 300 continues until there are no more data packets provided for processing. The method 300 can also be implemented in parallel so it can process multiple data packets simultaneously. In an embodiment, the method 300 corresponds to the devices discussed with respect to FIGS. 1–2.

While the invention has been described with reference to the illustrated embodiments, this description is not intended to be construed in a limiting sense. Various modifications of the illustrated embodiment as well as other embodiments of the invention will become apparent to those persons with ordinary skill in the art upon reference to this description. For example, a small computer system interface (SCSI) can be used as the communication interfaces. Also, multiple data packets can be processed simultaneously. It will be, therefore, understood that the invention is defined not by the above description, but by the appended claims.

What is claimed is:

1. A method for filtering a plurality of data packets, the method comprising:

receiving a data packet from the plurality of the data packets, the received data packet having source, destination, and protocol information;

extracting the source, destination, and protocol information from the received data packet;

providing the extracted information to a non-user configurable decision block, the decision block including information on which services are authorized depending on the extracted information, the non-configurable decision block being substantially free from user adjustment;

dropping the received data packet if the extracted information indicates a request for access to an unauthorized service; and permitting the received data packet to go through if the extracted information indicates a request for access to an authorized service, wherein the protocol information includes information about transport types.

2. The method of claim 1 wherein the decision block information is substantially unrelated to an IP address of the data packet to allow the non-user configurable decision block to operate without knowledge of any IP addresses.

3. The method of claim 1 wherein the received data packet is stored in a storage device.

4. The method of claim 3 wherein while the data packet is stored in the storage device, selected bits are read off the data packet.

5. The method of claim 4 wherein the selected bits being read contain the source, destination, and communication protocol information.

6. The method of claim 1 wherein the transport types are selected from a group comprising UDP, TCP, and ICMP.

7. The method of claim 1 wherein multiple data packets are filtered simultaneously.

8. The method of claim 1 wherein the authorized services are selected from a list comprising SMTP, POP, POP3, HTTP, HTTPS, Real Audio, VPN, H.323, and DHCP.

9. The method of claim 8 wherein the list further includes Telnet and FTP.

10. A computer security apparatus comprising:

a first communication interface coupled to a public network, the first communication interface configured to receive data from the public network, the public network data including a plurality of data packets;

a packet analyzer coupled to the first communication interface, the packet analyzer configured to receive and analyze the data packets from the public network, the packet analyzer including:

a protocol storage device coupled to the first communication interface, the protocol storage device configured to store communication protocol information associated with a first data packet from the plurality of the received data packets;

a source port storage device coupled to the protocol storage device, the source port storage device configured to store source port information associated with the first data packet;

a destination port storage device coupled to the source port storage device, the destination port storage device configured to store destination port information associated with the first data packet, and a lookup table device coupled to the protocol storage, the source port storage, and the destination port storage devices, the lookup table configured to determine based on the data within the first data packet whether the first data packet should be authorized to be transferred through the computer security apparatus; and a second communication interface coupled to a private network and the packet analyzer, the second communication interface configured to receive the authorized data from the packet analyzer for sending to the private network;

wherein the packet analyzer only permits data packets for a selected group of Internet services to be transferred to the private network and the lookup table device is non-configurable by a computer user, and the communication protocol information includes information about transport types.

11. The apparatus of claim 10 wherein the public network is the Internet.

12. The apparatus of claim 10 wherein the private network is selected from a group comprising an intranet, a LAN, and a single computer.

13. The apparatus of claim 10 wherein the private network is a personal computer running an operating system that utilizes a networking protocol.

14. The apparatus of claim 13 wherein the networking protocol is selected from a group comprising of Windows, Macintosh, Linux, and Unix.

15. The apparatus of claim 10 wherein the first and second communication interfaces are selected from a group comprising Ethernet, TokenRing, Frame Relay, ATM, USB, and FDDI.

16. The apparatus of claim 10 wherein the first and second communication interfaces have an RJ45 connection.

17. The apparatus of claim 10 further including a modem coupling the public network and the first network interface.

18. The apparatus of claim 17 wherein the modem has an RJ45 connection.

19. The apparatus of claim 17 wherein the modem connects to the public network via broadband communications.

20. The apparatus of claim 17 wherein the modem connects to the public network by hardware selected from a group comprising ISDN, DSL, ADSL, HDSL, and cable modems.

21. A computer security apparatus comprising:

a first communication interface coupled to a public network, the first communication interface configured to receive data from the public network, the public network data including a plurality of data packets;

a packet analyzer coupled to the first communication interface, the packet analyzer configured to receive and analyze the data packets from the public network, the packet analyzer including:

a protocol storage device coupled to the first communication interface, the protocol storage device configured to store communication protocol information associated with a first data packet from the plurality of the received data packets;

a source port storage device coupled to the protocol storage device, the source port storage device configured to store source port information associated with the first data packet;

a destination port storage device coupled to the source port storage device, the destination port storage device configured to store destination port information associated with the first data packet, a lookup table device coupled to the protocol storage, the source port storage, and the destination port storage devices, the lookup table configured to determine based on the data within the first data packet whether the first data packet should be authorized to be transferred through the computer security apparatus; and a second communication interface coupled to a private network and the packet analyzer, the second communication interface configured to receive the authorized data from the packet analyzer for sending to the private network, wherein the packet analyzer only permits data packets for a selected group of Internet services to be transferred to the private network and the lookup table device is non-configurable by a computer user, the second communication interface is configured to receive data from the private network, the private network data including a plurality of data packets;

the packet analyzer is configured to receive and analyze the data packets from the private network;

the first communication interface is configured to receive data from the packet analyzer, and the packet analyzer only permits data packets for a selected group of Internet services to be transferred to the public network.

22. The apparatus of claim 21 wherein:

the protocol storage device is configured to store communication protocol information associated with a second data packet from the plurality of the private network data packets;

the source port storage device is configured to store source port information associated with the second data packet; and the destination port storage device is configured to store destination port information associated with the second data packet.

23. The apparatus of claim 22 further including a second lookup table device coupled to the protocol, source port, and destination port storages, the second lookup table device configured to determine based on the data within the second data packet whether the second data packet should be authorized to be transferred through the computer security apparatus.

24. The apparatus of claim 23 where the two lookup table devices are incorporated together.

25. A service level computer security apparatus comprising:

means for receiving a data packet from a plurality of data packets, the received data packet having source, destination, and protocol information;

means for extracting the source, destination, and protocol information from the received data packet;

means for providing the extracted information to a non-user configurable decision block, the decision block including information on which services are authorized depending on the extracted information;

means for dropping the received data packet if the extracted information indicates a request for access to an unauthorized service; and means for permitting the received data packet to go through if the extracted information indicates a request for access to an authorized services, wherein the protocol information includes information about transport types.

26. A method for converting an unsecured digital transmission line into a secured digital transmission line for transmission of digital data, the digital data being selected from a transmission medium selected from cable modem, xDSL, and other network communications, the method comprising:

providing an unsecured network connection, the network connection being coupled to a computer network, the computer network being coupled to a first network and a second network;

inserting into the network connection a computer security apparatus, the computer security apparatus comprising a first communication interface coupled to the first network, the first communication interface configured to receive data from the first network, the first network data including a plurality of data packets; a packet analyzer coupled to the first communication interface, the packet analyzer configured to receive and analyze the data packets from the first network, the packet analyzer including:

a protocol storage device coupled to the first communication interface, the protocol storage device configured to store communication protocol information associated with a first data packet from the plurality of the received data packets;

a source port storage device coupled to the protocol storage device, the source port storage device configured to store source port information associated with the first data packet;

a destination port storage device coupled to the source port storage device, the destination port storage device configured to store destination port information associated with the first data packet, and a lookup table device coupled to the protocol storage, the source port storage, and the destination port storage devices, the lookup table configured to determine based on the data within the first data packet whether the first data packet should be authorized to be transferred through the computer security apparatus; and a second communication interface coupled to the second network and the packet analyzer, the second communication interface configured to receive the authorized data from the packet analyzer for sending to the second network; the packet analyzer only permitting data packets for a selected group of Internet services to be transferred to the private network and the lookup table device is non-configurable by a computer user, which is coupled to the second network.

* * * * *